US012625080B2

(12) United States Patent
Zhang et al.

(10) Patent No.: US 12,625,080 B2
(45) Date of Patent: May 12, 2026

(54) MULTI-COLOR PULSE-AMPLITUDE MODULATED HANDHELD FLUORESCENCE IMAGER

(71) Applicant: Agency for Science, Technology and Research, Singapore (SG)

(72) Inventors: Ruochong Zhang, Singapore (SG); Dinish Unnimadhava Kurup Soudamini Amma, Singapore (SG); Malini Carolene Devapiriyai Olivo, Singapore (SG); Ju Teng Teo, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 179 days.

(21) Appl. No.: 18/293,753

(22) PCT Filed: Sep. 14, 2022

(86) PCT No.: PCT/SG2022/050652
§ 371 (c)(1),
(2) Date: Jan. 30, 2024

(87) PCT Pub. No.: WO2023/063877
PCT Pub. Date: Apr. 20, 2023

(65) Prior Publication Data
US 2024/0344988 A1      Oct. 17, 2024

(30) Foreign Application Priority Data
Oct. 11, 2021      (SG) ........................... 10202111286W

(51) Int. Cl.
G01N 21/64      (2006.01)
G01N 21/63      (2006.01)
G01N 21/84      (2006.01)

(52) U.S. Cl.
CPC ... G01N 21/6486 (2013.01); *G01N 2021/635* (2013.01); *G01N 2021/8466* (2013.01); *G01N 2201/0221* (2013.01)

(58) Field of Classification Search
CPC ......... G01N 21/6486; G01N 2021/635; G01N 2021/8466; G01N 2201/0221
See application file for complete search history.

(56) References Cited

U.S. PATENT DOCUMENTS 8,481,974 B1      7/2013  Davis et al.
2005/0072935 A1*  4/2005  Lussier .............. G01N 21/6486
250/458.1

(Continued)

FOREIGN PATENT DOCUMENTS

WO      2010101460 A1      9/2010

OTHER PUBLICATIONS

Yoshioka et al., "Use of Image Analysis to Estimate Anthocyanin and UV-excited Fluorescent Phenolic Compound Levels in Strawberry Fruit," Breeding Science, vol. 63, 2013, pp. 211-217.

(Continued)

*Primary Examiner* — Hugh Maupin
(74) *Attorney, Agent, or Firm* — Shackelford, McKinley & Norton, LLP

(57)      ABSTRACT

A portable device operable to identify photosynthetic activity and contents of compounds in a plant part. The portable device includes a light source including light-emitting diodes operable to irradiate the plant part with light. The portable device further includes a control module operable to have the light-emitting diodes emit the light as pulse signals. Additionally, the portable device includes a focus-adjustable lens and a filter optically coupled to the light source, where the adjustable lens and the filter are co-operable to consolidate light reflected from the plant part (Continued)

which may be irradiated by light from the light-emitting diodes. Furthermore, the portable device includes a detector optically positioned to receive from the focus-adjustable lens and the filter the light reflected from the plant part, where the light reflected from the plant part corresponds to the photosynthetic activity and contents of compounds in the plant part.

17 Claims, 9 Drawing Sheets

(56)                   References Cited

U.S. PATENT DOCUMENTS

| | | | |
|---|---|---|---|
| 2012/0061586 A1* | 3/2012 | Yao | G01N 21/6486 |
| | | | 250/461.1 |
| 2013/0152464 A1 | 6/2013 | Groz et al. | |
| 2016/0349180 A1 | 12/2016 | Tischler et al. | |
| 2020/0068810 A1* | 3/2020 | Pahlevaninezhad | H05B 47/11 |
| 2022/0099578 A1* | 3/2022 | Majumdar | G01J 3/0264 |
| 2023/0324298 A1* | 10/2023 | Holzwarth | G01N 21/6408 |
| | | | 356/451 |

OTHER PUBLICATIONS

Cerovic et al., "Ultraviolet-Induced Fluorescence for Plant Monitoring: Present State and Prospects," Agronomie, EDP Sciences, vol. 19, No. 7, 1999, pp. 543-578.
Llyod Donaldson, "Autofluorescence in Plants," Molecules, vol. 25, 2020, pp. 1-20.
Zhang et al., "Handheld Multifunctional Fluorescence Imager for Non-invasive Plant Phenotyping," Frontiers in Plant Science, vol. 13, Article 822634, Apr. 2022, pp. 1-9.
International Search Report for International Application No. PCT/SG2022/050652 dated May 4, 2023, pp. 1-4.
Written Opinion of the International Searching Authority for International Application No. PCT/SG2022/050652 dated May 4, 2023, pp. 1-5.

* cited by examiner

FIG. 4D

MULTI-COLOR PULSE-AMPLITUDE MODULATED HANDHELD FLUORESCENCE IMAGER

CROSS-REFERENCE TO RELATED APPLICATION

This application claims the benefit of priority of Singapore Patent Application No. 10202111286W, filed 11 Oct. 2021, the content of it being hereby incorporated by reference in its entirety for all purposes.

TECHNICAL FIELD

The present disclosure relates to a portable device operable to identify photosynthetic activity and contents of compounds in a plant part. The present disclosure also relates to a method of identifying photosynthetic activity and contents of compounds in a plant part using the portable device.

BACKGROUND

Traditional lab based chemical and analytical methods for plant phenotyping may be accurate but unfortunately tend to be time-consuming. Chlorophyll fluorescence may be a key indicator of photosynthetic (PS) energy conversion in plants, which may be valuable as an alternative to be studied for replacing the traditional laboratory methods. Current fluorescence system for plant phenotyping tends to be either single-point measurement without imaging capability or imaging tends to be carried out relative to photosynthetic activity only. There appears to be no fluorescence imaging system operable to identify both photosynthetic activity and compound(s) that may be present in a plant, wherein the measurements can be taken pixel-wisely.

There is thus a need to provide for a solution that addresses one or more of the limitations mentioned above.

SUMMARY

In a first aspect, there is provided for a portable device operable to identify photosynthetic activity and contents of compounds in a plant part, the portable device comprises:

a light source comprising light-emitting diodes operable to irradiate the plant part with light comprising more than one wavelength;

a control module operable to (i) have the light-emitting diodes emit the light as pulse signals and (ii) modulate amplitude and width of the pulse signals;

a focus-adjustable lens and a filter optically coupled to the light source, wherein the adjustable lens and the filter are co-operable to consolidate light reflected from the plant part which is irradiated by light from the light-emitting diodes; and a detector optically positioned to receive from the focus-adjustable lens and the filter the light reflected from the plant part, wherein the light reflected from the plant part corresponds to the photosynthetic activity and contents of compounds in the plant part, and the light reflected is transmitted as fluorescence.

In another aspect, there is provided a method of identifying photosynthetic activity and contents of compounds in a plant part using the portable device described in various embodiments of the first aspect, the method comprising:

irradiating the plant part with light comprising more than one wavelength from a light source comprising light-emitting diodes;

operating a control module to (i) have the light-emitting diodes emit the light as pulse signals and (ii) modulate amplitude and width of the pulse signals;

operating a focus-adjustable lens and a filter to consolidate light reflected from the plant part which is irradiated by light from the light-emitting diodes, wherein the focus-adjustable lens and the filter are optically coupled to the light source; and operating a detector which is optically positioned to receive from the focus-adjustable lens and the filter the light reflected from the plant part, wherein the light reflected from the plant part corresponds to the photosynthetic activity and contents of compounds in the plant part, and the light reflected is transmitted as fluorescence.

BRIEF DESCRIPTION OF THE DRAWINGS

The drawings are not necessarily to scale, emphasis instead generally being placed upon illustrating the principles of the present disclosure. In the following description, various embodiments of the present disclosure are described with reference to the following drawings, in which:

FIG. 1B shows the charged coupled device (CCD) camera and lenses (e.g. wide-angle lenses), a side view of the long pass filter, and a side view of the panel comprising the various LEDs. The panel is a ring-shaped panel having a hole in the center through which the CCD camera and lenses are arranged. The CCD camera can be interchangeably referred to herein as a "charged coupled device (CCD) detector".

Figure 4D:
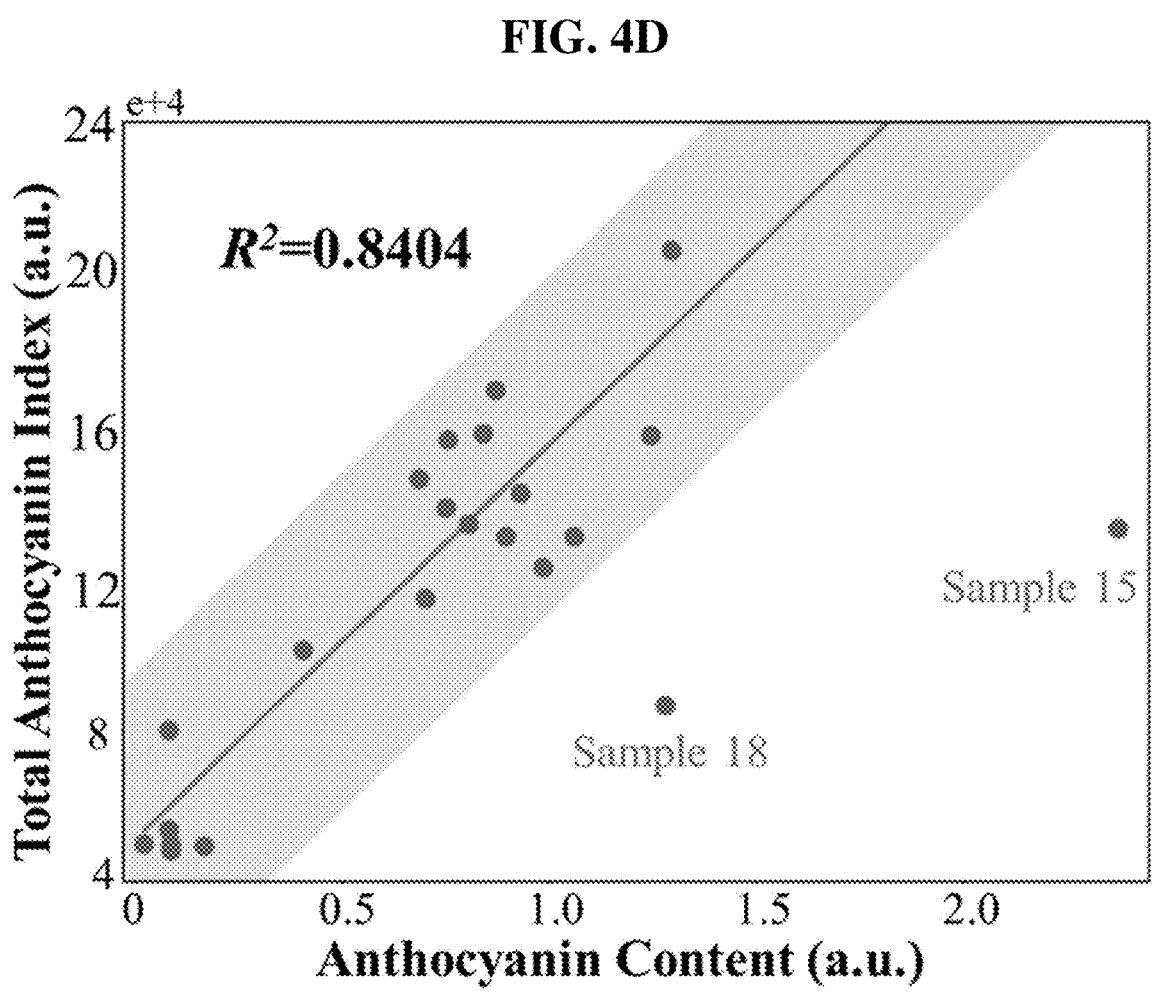

FIG. 4D is a plot of total anthocyanin index against anthocyanin content, which shows the correlation between the sum of pixel-wise anthocyanin index measured non-invasively using the device and method of the present disclosure. The total anthocyanin content can also be determined by extraction from the leaf samples. The biochemically measured anthocyanin content is expressed in arbitrary units (a.u.) Data falling in the shaded region (residuals within median absolution deviations (MAD)) are classified as inliers.

DETAILED DESCRIPTION

Figure 1A:
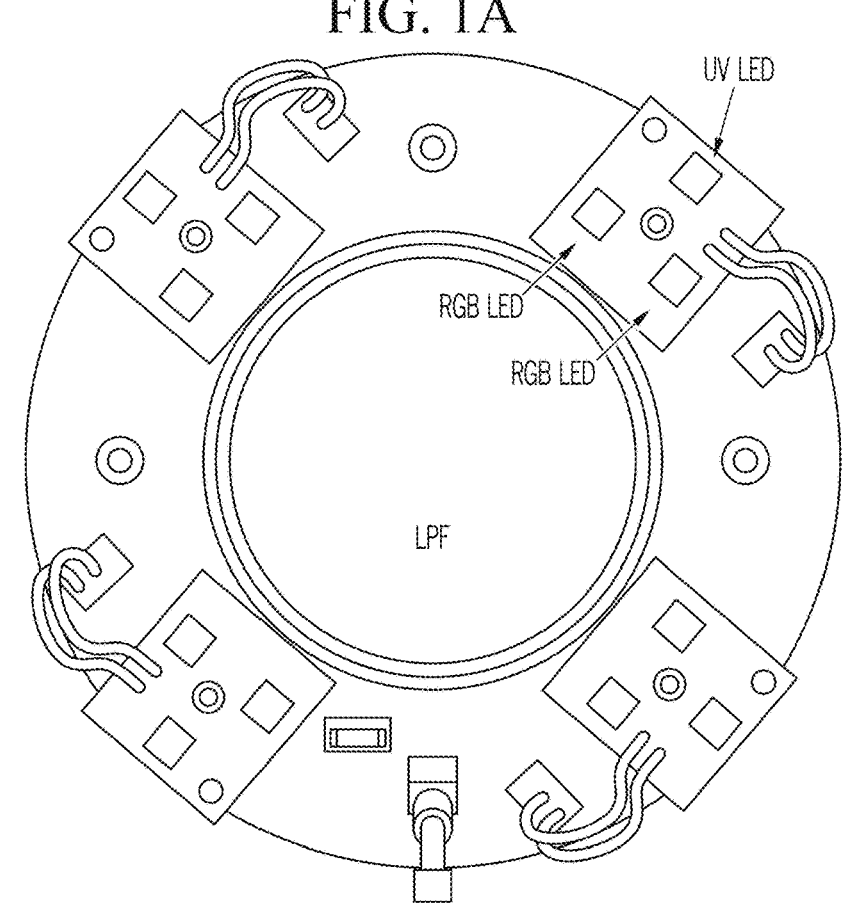
FIG. 1A is a photograph showing a device of the present disclosure (from a bottom-up view). The device is operable as a handheld multi-color pulse-amplitude modulated (PAM) fluorescence imager. As can be seen in FIG. 1A, the device includes a panel comprising various light-emitting diodes (LEDs) configured circumferentially thereon with a long pass filter (LPF) arranged in the center of the panel. The panel having the various LEDs may be collectively referred to herein as a light source. The various LEDs may include RGB (red-green-blue) LEDs and ultraviolet (UV) LEDs. In this non-limiting example prototype, there is a total of eight RGB LEDs arranged circumferential to the long pass filter. In addition, four UV LEDs are arranged peripheral to the RGB LEDs and circumferential to the long pass filter.

The following detailed description refers to the accompanying drawings that show, by way of illustration, specific details and embodiments in which the present disclosure may be practised.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

The present disclosure relates to a portable device operable to identify photosynthetic activity and contents of compounds in a plant part. The present device is referred to herein as a compact multi-color handheld pulse-amplitude modulated (PAM) fluorescence imager for plant phenotyping. The present device advantageously provides multi-parameter real-time and wide-field functional images.

In one example, the present device is operable to have PAM blue LED utilized for photosynthetic activity monitoring, green and red LEDs utilized for anthocyanin measurement, and UV and red LEDs for flavonol measurement. That is to say, the present device and method can measure multiple parameters sequentially in the same region of the plant/leaf. Advantageously, through a combination of different lights used, the present device is operable to quantify plant stress, growing condition and nutrition in a continuous, non-contact and non-destructive way. Besides, the present device is portable for use indoor and at an outdoor site.

The present disclosure also relates to a method of identifying photosynthetic activity and contents of compounds in a plant part using the portable device.

Details of various embodiments of the present device, method, and advantages associated with the various embodiments are now described below. Where the embodiments and advantages are described in the examples section further hereinbelow, they shall not be reiterated for brevity.

In the present disclosure, there is provided a portable device operable to identify photosynthetic activity and contents of compounds in a plant part. Advantageously, the present device and method are able to measure not only photosynthetic activity, but also at least anthocyanin and flavonol.

Adding anthocyanin and flavonol (anti-oxidant) fluorescence measurements to chlorophyll fluorescence measurement is not simply just adding to or combining any existing approaches. Such additional elements render the present device and method entirely distinct from the working principle, system design, functions and operation mode of existing devices and methods. The working principle of the present device and method may differ from existing devices and method in one or more ways. In the present device and method, polyphenol measurement is based on screening effect of polyphenols on chlorophyll fluorescence, which utilizes fluorescence ratio induced by two excitation wavelengths. For instance, the present device and method are able to adjust the pulse width and amplitude to obtain maximal/saturated fluorescence and minimal/start fluorescence immediately with two pulses. There is no need to shine light of a series of pulses which is time consuming. One weak and short pulse (measurement light) induces minimal/start fluorescence. One strong and long pulse (saturation pulse) induces maximal/saturated fluorescence.

The components of the present device are integrated therein and hence the present device is advantageously compact, enabling different application scenarios, i.e. can be handheld, mountable on robotic arm/drone and in a chamber.

The portable device may comprise a light source comprising light-emitting diodes operable to irradiate the plant part with light comprising more than one wavelength, a control module operable to (i) have the light-emitting diodes emit the light as pulse signals and (ii) modulate amplitude and width of the pulse signals, a focus-adjustable lens and a filter optically coupled to the light source, wherein the adjustable lens and the filter are co-operable to consolidate light reflected from the plant part which is irradiated by light from the light-emitting diodes, and a detector optically positioned to receive from the focus-adjustable lens and the filter the light reflected from the plant part, wherein the light reflected from the plant part corresponds to the photosynthetic activity and contents of compounds in the plant part, and the light reflected is transmitted as fluorescence.

In various embodiments, the light source may comprise the light-emitting diodes arranged circumferentially to the detector. In various embodiments, the light source may comprise the light-emitting diodes arranged circumferentially on a panel, and wherein the panel may comprise an opening which the detector is optically positioned at to receive the light reflected from the plant part.

In various embodiments, the light comprising more than one wavelength may have a wavelength ranging from 100 nm to 760 nm.

In various embodiments, the control module is operable to have each of the light-emitting diodes independently emit light at different brightness.

In various embodiments, the control module is operable to have the light-emitting diodes emit blue light, wherein the blue light comprises a first pulse signal and a second pulse signal, and wherein the first pulse signal has a shorter pulse width and a lower amplitude than the second pulse signal.

In various embodiments, the control module is operable to have the light-emitting diodes emit red light and then green light, and wherein the red light and the green light are configured to produce identical photoactive radiation.

In various embodiments, the control module is operable to have the light-emitting diodes emit red light and then ultraviolet light, and wherein the red light and the ultraviolet light are configured to produce identical photoactive radiation.

In various embodiments, the filter may comprise a long-pass filter which consolidates fluorescence reflected from the plant part. In the present disclosure, the long pass filter (for example, >700 nm) may stop photons in the UV and visible range.

In various embodiments, the detector may be a charge-coupled device detector. The charge-coupled device detector may be a charged-coupled device camera.

The present disclosure also relates to a method of identifying photosynthetic activity and contents of compounds in a plant part using the portable device described in various embodiments of the first aspect. Embodiments and advantages described for the present device of the first aspect can be analogously valid for the present method subsequently described herein, and vice versa. Where the embodiments and advantages have already been described above and in the examples section, they shall not be iterated for brevity.

The method may comprise irradiating the plant part with light comprising more than one wavelength from a light source comprising light-emitting diodes, operating a control module to (i) have the light-emitting diodes emit the light as pulse signals and (ii) modulate amplitude and width of the pulse signals, operating a focus-adjustable lens and a filter to consolidate light reflected from the plant part which is irradiated by light from the light-emitting diodes, wherein the focus-adjustable lens and the filter are optically coupled to the light source, and operating a detector which is optically positioned to receive from the focus-adjustable lens and the filter the light reflected from the plant part, wherein the light reflected from the plant part corresponds to the photosynthetic activity and contents of compounds in the plant part, and the light reflected is transmitted as fluorescence.

In various embodiments, irradiating the plant part with the light comprising more than one wavelength may comprise operating the light-emitting diodes at a voltage ranging from 0.1 mV to 10 V, 1 mV to 10 V, etc., and/or operating each of the light-emitting diodes independently at 0.1 mA to 10 A, 1 A to 10 A, etc., to emit light at different brightness.

In various embodiments, operating a control module to (i) have the light-emitting diodes emit the light as pulse signals and (ii) modulate amplitude and width of the pulse signals may comprise operating the control module to have the light-emitting diodes irradiate blue light having a first pulse signal on the plant part to induce a minimum or steady state fluorescence intensity signal from the plant part, operating the control module to have the light-emitting diodes irradiate blue light having a second pulse signal on the plant part to induce a maximum fluorescence intensity signal from the plant part in a lit environment, and wherein the first pulse signal has a shorter pulse width and a lower amplitude than the second pulse signal.

In various embodiments, operating the control module to have the light-emitting diodes irradiate blue light having the first pulse signal on the plant part may be carried out in a dark environment or a lit environment.

In various embodiments, the method may further comprise subtracting the maximum fluorescence intensity signal with the minimum or steady state fluorescence intensity signal to obtain a numerator, and dividing the numerator with the maximum fluorescence intensity signal to identify the photosynthetic activity.

In various embodiments, operating a control module to (i) have the light-emitting diodes emit the light as pulse signals and (ii) modulate amplitude and width of the pulse signals may comprise operating the control module to have the light-emitting diodes irradiate red light on the plant part to induce a first far-red fluorescence intensity signal from the plant part, and then irradiate green light on the plant part to induce a second far-red fluorescence intensity signal from the plant part. In such non-limiting embodiments, the method may further comprise dividing the first far-red fluorescence intensity signal by the second far-red fluorescence intensity signal to obtain a numerical value, and taking a logarithm of the numerical value to identify anthocyanin content in the plant part.

In various embodiments, operating a control module to (i) have the light-emitting diodes emit the light as pulse signals and (ii) modulate amplitude and width of the pulse signals may comprises operating the control module to have the light-emitting diodes irradiate red light on the plant part to induce a first far-red fluorescence intensity signal from the plant part, and then irradiate ultraviolet light on the plant part to induce a second far-red fluorescence intensity signal from the plant part. In such non-limiting embodiments, the method may further comprise dividing the first far-red fluorescence intensity signal by the second far-red fluorescence intensity signal to obtain a numerical value, and taking a logarithm of the numerical value to identify a flavonol content in the plant part.

In various embodiments, the pulse width and amplitude may be interdependent. In various embodiments, the overall illumination intensity may be referred to instead of the pulse width and amplitude. For example, in embodiments where blue light is emitted, e.g. for photosynthetic activity measurement, the first pulse signal, i.e. weak and short measurement light (ML), may be 10 $\mu$mol photons $m^{-2}s^{-1}$ or less, and the second pulse signal, i.e. strong and long saturation pulse (SP), may have an intensity of 3000 $\mu$mol photons $m^{-2}s^{-1}$ or more.

In various embodiments, the pulse width may range from us to ms. For example, the pulse width may range from us to ms such that the generated fluorescence is observably strong enough and can be received by the detector. This may apply for anthocyanin and/or flavonol measurements.

As a further non-limiting example, in embodiments where the red light and green light are emitted for anthocyanin measurement, the pulse width of the red and green light may be 100 ms. In certain non-limiting instances, the pulse width and the time for irradiating the plant part may be both 100 ms. In embodiments where the red light and green light are emitted for anthocyanin measurement, the pulse width and amplitude of the red and green light may be configured such that their output photoactive radiation (PAR) are identical. In various non-limiting embodiments, the green light wavelength may range from 495 nm to 570 nm and the red light wavelength may range from 630 nm to 650 nm. Both the green and red light are shined on the plant part to induce far-red fluorescence which can be received by the detector after passing through the long-pass filter. In the present disclosure, $F_{green}$ refers to far-red fluorescence induced by the green light and not green fluorescence, and $F_{red}$ refers to far-red fluorescence induced by the red light. The irradiation time of both red and green light may be equal or not equal. In various embodiments, to identify anthocyanin content in the plant part, the first far-red fluorescence intensity signal may be divided by the second far-red fluorescence intensity signal to obtain a numerical value, and then taking a logarithm of the numerical value to identify the anthocyanin. This may be denoted by the formula: Anthocyanin=log $(F_{red}/F_{green})$, or log $F_r/F_g$ for brevity.

As another further non-limiting example, in embodiments where the red light and ultraviolet light are emitted for flavonol measurement, the pulse width of the red and ultraviolet light may be 100 ms. In certain non-limiting instances, the pulse width and the time for irradiating the plant part may be both 100 ms. In embodiments where the red light and ultraviolet light are emitted for flavonol measurement, the pulse width and amplitude of the red and ultraviolet light may be configured such that their output photoactive radiation (PAR) are identical. In various non-limiting embodiments, the ultraviolet light wavelength may range from 320 nm to 380 nm and the red light wavelength may range from 630 nm to 650 nm. $F_{uv}$ refers to far-red fluorescence induced by the ultraviolet light. The irradiation time of both red and ultraviolet light may be equal or not equal. In various embodiments, to identify a flavonol content in the plant part, the first far-red fluorescence intensity signal may be divided by the second far-red fluorescence intensity signal to obtain a numerical value, and then taking a logarithm of the numerical value. This may be denoted by the formula: Flavonol=log $(F_{red}/F_{uv})$, or log $F_r/F_{uv}$ for brevity.

In various embodiments, the voltage and current which the light-emitting diodes operate at may depend on the light-emitting diodes used. The working range may be from tens of mV to tens of V and/or several mA to tens of A.

The terms "pulse width" and "pulse duration" may be used interchangeably. Said differently, there is no difference between "width" and "duration" in the context of a pulse signal in the present disclosure.

The word "substantially" does not exclude "completely" e.g. a composition which is "substantially free" from Y may be completely free from Y. Where necessary, the word "substantially" may be omitted from the definition of the present disclosure.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance.

As used herein, the term "and/or" includes any and all combinations of one or more of the associated listed items.

Unless specified otherwise, the terms "comprising" and "comprise", and grammatical variants thereof, are intended to represent "open" or "inclusive" language such that they include recited elements but also permit inclusion of additional, unrecited elements.

EXAMPLES

The present disclosure relates to a portable device operable to identify photosynthetic activity and contents of compounds in a plant part, and its method of use.

The portable device is operable as a handheld multi-color fluorescence imager, a device that can measure multiple plant parameters via wide-field and real-time images. Apart from dynamic photosynthetic activities, the device can provide, for example, anthocyanin and flavonol index pixelwisely. That is to say, in one non-limiting example, the device can provide an indication of the amount of anthocyanin and flavonol of a plant part, such as over the entire surface of a leaf (instead of having to measure spot by spot), and the precision of imaging can be up to the extent of a pixel even when a large area is measured. Understandably, the device is capable of identifying whether compounds, such as anthocyanin and flavonol, are absent or present.

The device is advantageously compact so as to be portable. For example, the board-level circuit design for an LED driver of the device renders the device compact enough to be used by handheld, and even for mounting on a drone or mechanical arm for operation in indoor and outdoor farms.

As mentioned above, the present device is operable as a handheld multi-color fluorescence imager that can measure multiple plant parameters. The present device is operable to provide at least the following functions in wide-field and real-time image formats: (i) rendering blue LED induced dynamic fluorescence images to measure plant photosynthetic activities, (ii) rendering red and green LEDs induced differential fluorescence yield to acquire anthocyanin content index, and (iii) rendering red and ultraviolet (UV) LEDs induced differential fluorescence yield to measure flavonols content index. The field of view (FOV) can be adjusted from several centimeters to several meters depending the working distance required. The acquisition of images is real-time, this means that the plant dynamic (real time and ongoing) activities can be monitored as well. Further, due to the device's compact size, it can be used in indoor and outdoor farms whether by manual or automatic operation.

The present device and its method of use are described in further details, by way of non-limiting examples, as set forth below.

Example 1: Non-Limiting Example of a Prototype of the Present Device

Figure 1B:
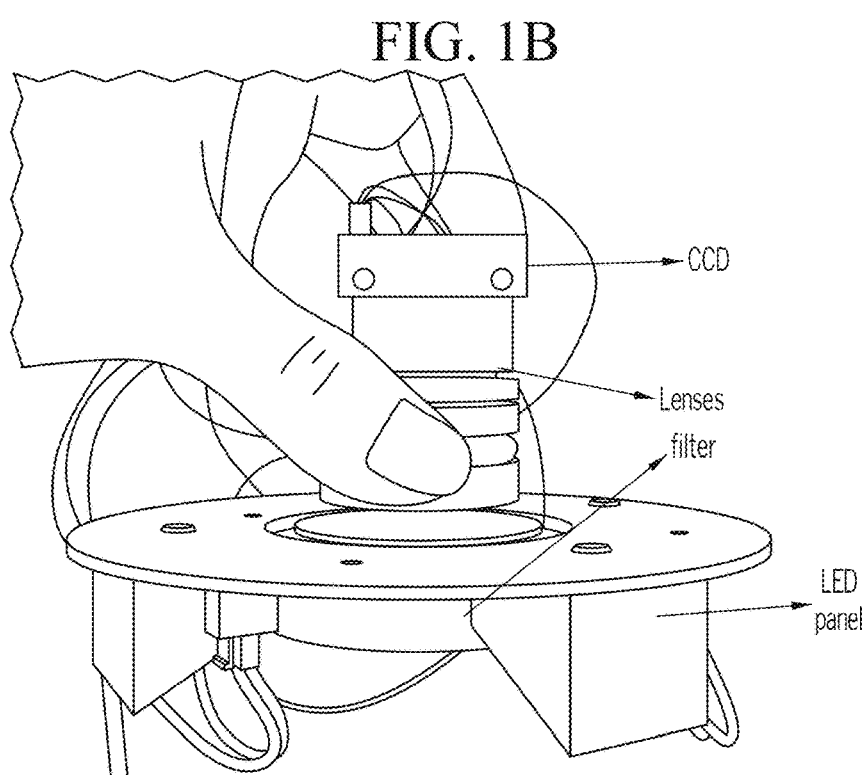
FIG. 1B is a photograph showing a side view of the same device in FIG. 1A.

The device of the present disclosure, also referred to herein as a handheld fluorescence imager, can include at least two parts: (1) a multi-color LED panel and (2) a detector, such as a compact charge-coupled device (CCD) camera (see FIGS. 1A and 1B as non-limiting examples).

The multi-color LED panel can be configured as a ring-shaped LED panel. That is to say, the LED panel can have a hole in the center for the detector (e.g. CCD camera) to be arranged therethrough. In this manner, the LED panel can be configured circumferentially to the CCD camera.

The multi-color LEDs on the panel can include RGB and UV LEDs. The LEDs can be mounted on four small blocks to ensure uniform illumination on a plant part (see FIG. 1A). The LEDs can be operated or driven by control module. The control module can include or is operably connected to a digital-controlled onboard current source. Pulse and amplitude of the light-emitted LEDs can be controlled via a data acquisition module (e.g. a NI DAQ card). The control module can include the data acquisition module.

The control module can be used to control the brightness. For example, the control module can be operable between 0.2 V to 1.3 V to have individual LED operated with a current ranging from 0.1 A to 1 A. In various instances, the light-emitting diodes can be operable at a voltage ranging from 0.1 mV to 10 V, and/or each of the light-emitting diodes can be operated independently at 0.1 mA to 10 A to emit light at different brightness.

The detector (e.g. CCD camera) can be operably connected to one or more focus-adjustable imaging lens and/or a filter (e.g. a long-pass filter) to collect fluorescence signals generated from the plant sample so as to render, for example, raw fluorescence images. The collected raw images can be sent to a process module which includes a computer operable for post-processing and displaying the eventual fluorescence images.

Example 2: Photosynthetic Measurement Using the Present Device

Figure 1C:
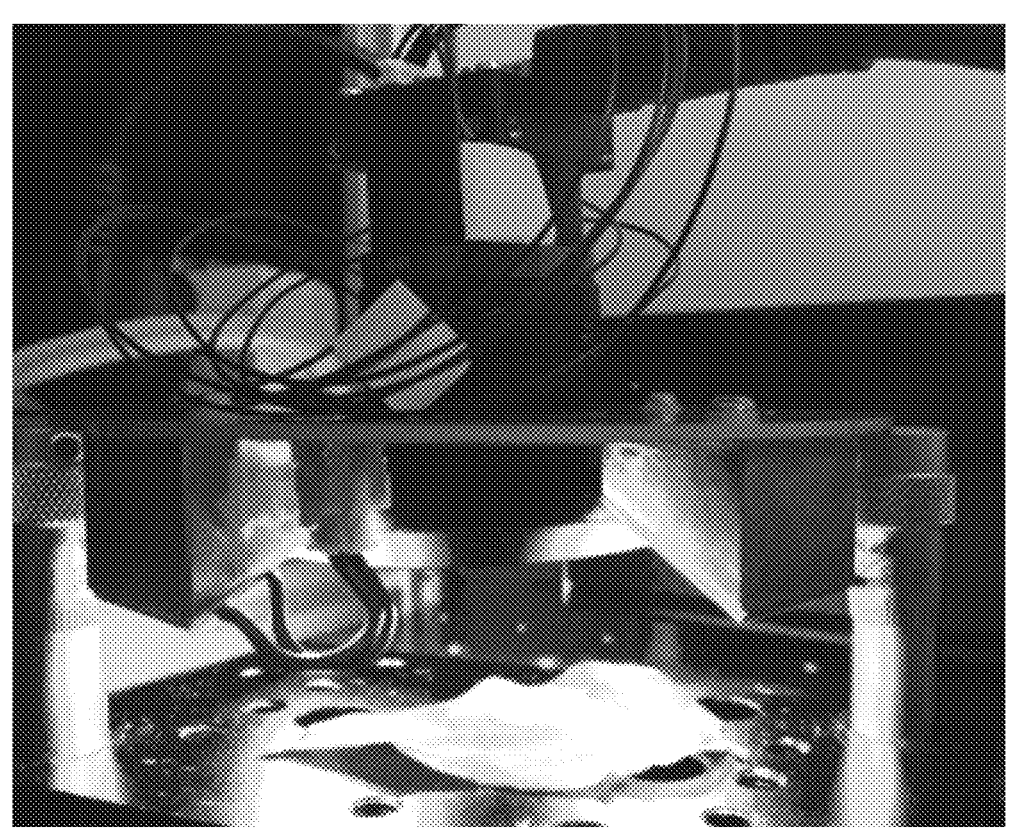
FIG. 1C shows the same device of FIGS. 1A and 1B operated to have light (e.g. RGB and/or UV light) emitted from the panel onto a leaf, herein used as a non-limiting example of a plant part. As shown and described in FIG. 1B, the CCD camera, lenses 20) and LPF of FIG. 1C are arranged in the center of the panel so as to collect the light reflected from the leaf sample to render one or more fluorescence images.
Figure 2A:
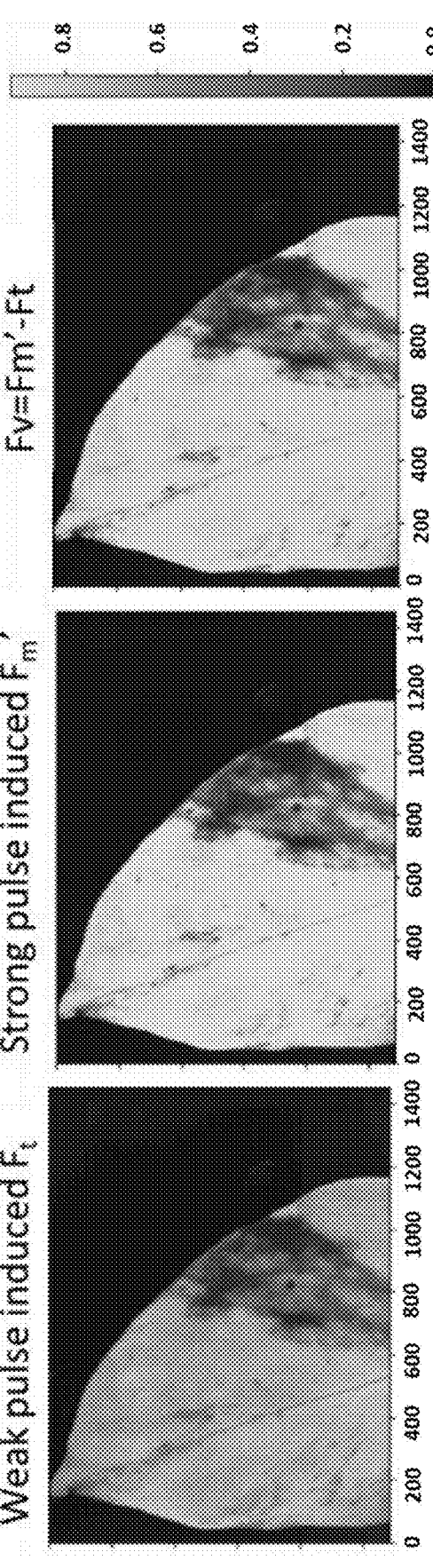
FIG. 2A shows preliminary imaging results of photosynthetic activity evaluation of a leaf sample using the device operated to emit blue light (e.g. the UV LED). The left image illustrates for a measurement light (ML) induced steady state fluorescence from the leaf (denoted as $F_t$). The measurement light herein refers to a type of light used as an excitation source for generating the fluorescence image from the leaf for the photosynthetic activity evaluation, wherein the measurement light is a weak light and has a short pulse. Hence, the image was produced using a weak pulse light to excite the leaf. The center image illustrates for a SP induced maximal fluorescence form the leaf (denoted $F_m'$). SP denotes for the light used as an excitation source for generating the fluorescence image from the leaf for the photosynthetic activity evaluation, wherein the light is a strong light and has a long saturation pulse (hence abbreviated SP). Hence, the image was produced using a strong pulse light to excite the leaf. The right image illustrates for the variable fluorescence ($F_v = F_m' - F_t$), which is the difference in fluorescence from the leaf between using ML and SP.

A blue LED was used as excitation source for photosystem II (PSII) measurement (see FIGS. 1C and 2A). A leaf sample was used as one non-limiting example of a plant part.

The light output from the LED of the panel is modulated in terms of its amplitude and pulse to generate light of two different pulses, i.e. one referred to as weak and short measurement light (ML), the other referred to as strong and long saturation pulse (SP). The output power and duration are controlled by the data acquisition module's analog output. The terms "short" and "long" refer to the pulse width of the light emitted from the LED. The terms "weak" and "strong" refer to the amplitude of the light emitted from the LED. The light output from the LED of the panel can also be continuous and moderate, e.g. actinic light (AL).

The ML is able to induce minimal fluorescence from a sample under dark adaption (denoted as $F_0$), or minimal fluorescence from a light-adapted sample (denoted as $F_0'$), or a steady state fluorescence $F_t$. The terms "dark adaptation" and "dark-adapted" in the present disclosure means that the light was emitted on the plant part in a dark environment (e.g. in a room with lights off) to generate the fluorescence signal from the plant part sample. The terms "light adaptation" and "light-adapted" in the present disclosure means the light was emitted on the plant part sample in a lit environment, for example, in a lit room.

The SP is able to induce maximal fluorescence $F_m$ from a sample with dark adaption when all photosystem II reaction centers are closed, or the SP is able to induce maximal fluorescence without dark adaptation (denoted as $F_m'$). In this instance, without dark adaptation means a lit environment was used.

Said differently, the ML and SP measurements were carried out by operating a control module to (i) have the light-emitting diodes emit the light, for example, as pulse signals, and (ii) modulate amplitude and width of the pulse signals, which can comprise operating the control module to have the light-emitting diodes irradiate blue light having a first pulse signal on the plant part (a leaf in this particular example) to induce a minimum or steady state fluorescence intensity signal from the plant part (for ML measurements), operating the control module to have the light-emitting diodes irradiate blue light having a second pulse signal on the plant part to induce a maximum fluorescence intensity signal from the plant part in a lit environment (for SP measurements), wherein the first pulse signal (e.g. ML) has a shorter pulse width and a lower amplitude than the second pulse signal (e.g. SP). The operation of the control module to have the light-emitting diodes irradiate blue light having the first pulse signal on the plant part can be carried out in a dark environment or a lit environment.

Aforesaid parameters (e.g. $F_0$, $F_0'$, $F_t$, $F_m$, $F_m'$) may be measured to evaluate the efficiency of photosystem II, the extent of photochemical and/or non-photochemical quenching, and the extent of plant stress, using the blue LED light.

Figure 2B:
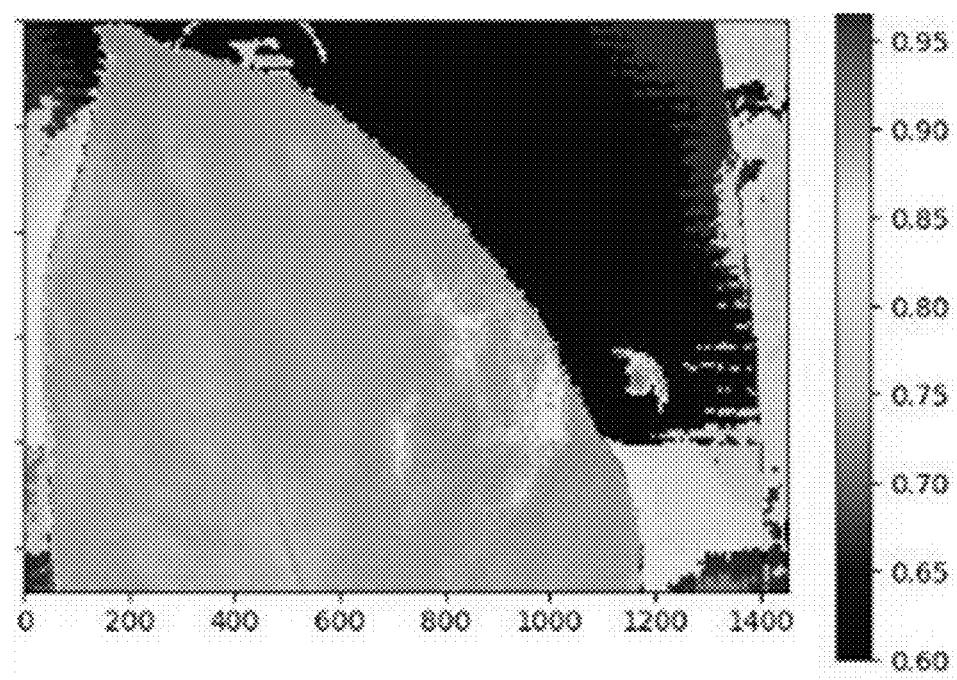
FIG. 2B illustrates a fluorescence image for determining the efficiency of the photosystem II (denoted as YII, which can be calculated from the obtained images as YII=($F_m'$–$F_t$)/$F_m'$=$F_v$/$F_m'$). Photosystem II refers to the first protein complex in the light-dependent reactions of oxygenic photosynthesis. It is generally located in the thylakoid membrane of plants and algae. Within the photosystem (which comprises functional and structural units of protein complexes involved in photosynthesis), there are enzymes that capture photons of light to energize electrons which may then be transferred through a variety of coenzymes and cofactors to reduce plastoquinone to plastoquinol. The energized electrons are replaced by oxidizing water to form hydrogen ions and molecular oxygen. By replenishing lost electrons with electrons from the splitting of water, photosystem II provides the electrons for all of photosynthesis to occur.

In one example, the experiment was carried out with no dark adaption adopted. Three ML followed by one SP were shot consecutively at a leaf sample to acquire $F_t$ and $F_m'$ images for the analysis. The field of view (FOV) and focal length can be adjusted through the wide-angle imaging lens and a 2 cm working distance and 3 cm by 4 cm FOV was adopted only for a non-limiting purpose of demonstration. The preliminary experiment was carried out using a green plant leaf as the sample without dark adaption and the result is shown in FIGS. 2A and 2B. The efficiency (i.e. operating efficiency) of the photosystem II (YII) can be calculated from measured images as $YII=(F_m'-F_t)/F_m'$, wherein $F_m'-F_t=F_v$. YII is an indicator of electron transport rate which relates to overall photosynthetic performance. It can be seen that the scarred area(s) of the leaf has lower fluorescence yield and lower YII. To describe in a different manner, the photosynthetic activity, using efficiency of YII as an indicator, can be derived by subtracting the maximum fluorescence intensity signal with the minimum or steady state fluorescence intensity signal to obtain a numerator ($F_v$), and dividing the numerator ($F_v$) with the maximum fluorescence intensity signal to identify the photosynthetic activity.

Figure 2C:
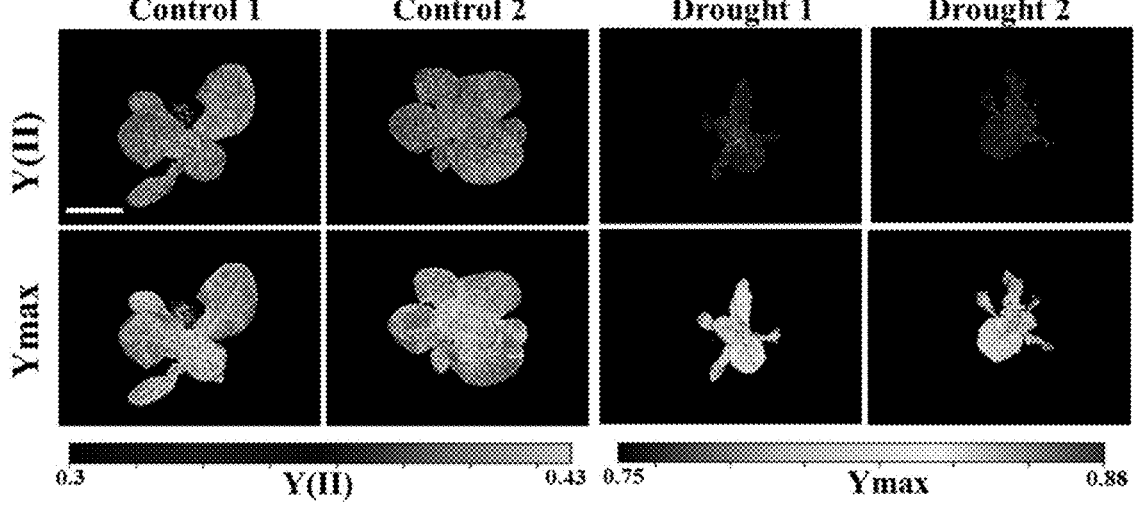
FIG. 2C shows the fluorescence images of leaf samples evaluated using the device and method of the present disclosure, that is, determining the efficiency of photosystem II. The samples include control samples, and leaves that are subjected to drought conditions. $Y_{max}$=($F_m$–$F_0$)/$F_m$, wherein $F_0$ denotes minimal fluorescence, $F_m$ denotes maximal fluorescence, and $Y_{max}$ denotes maximum photo-efficiency of photosystem II.
Figure 3:
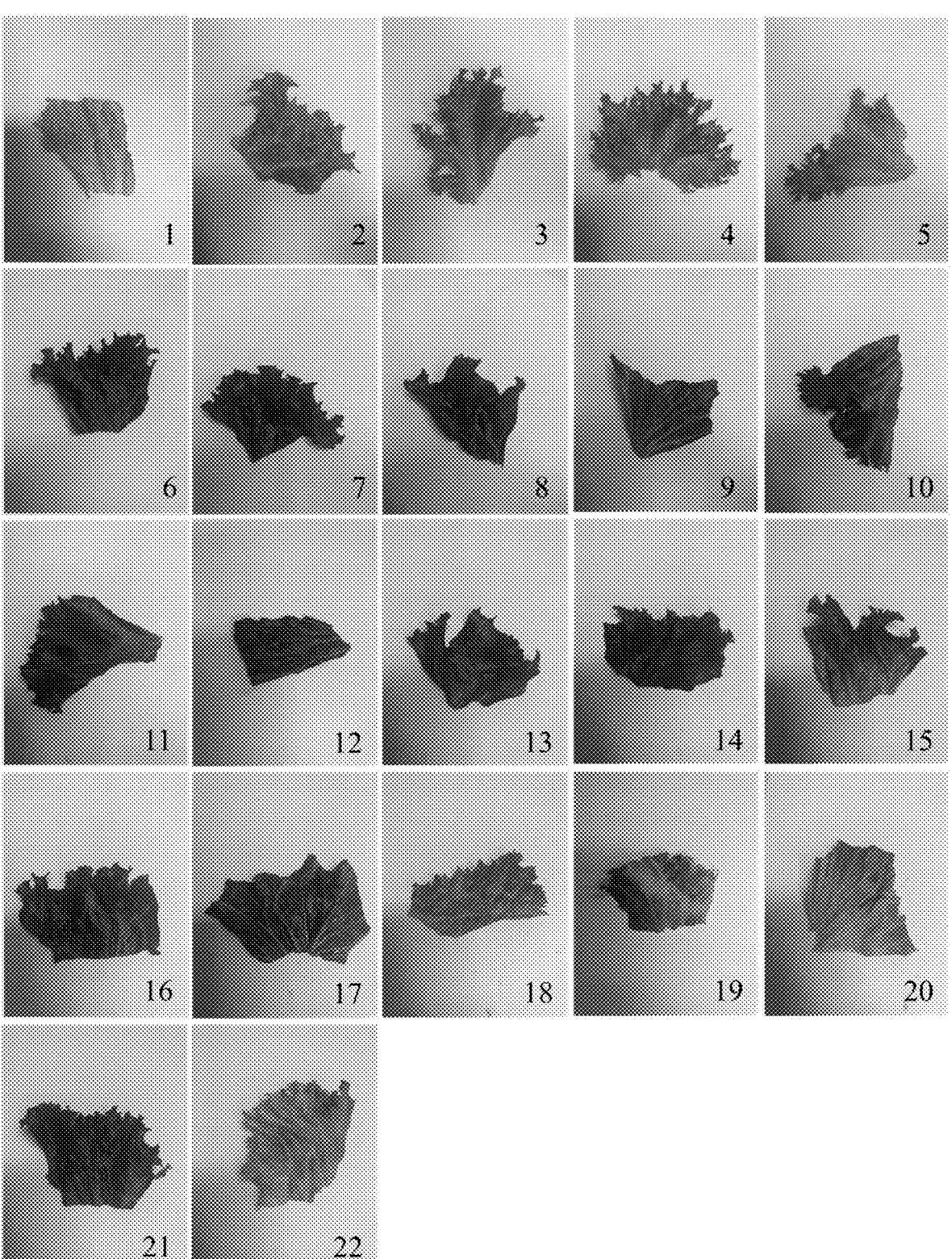
FIG. 3 shows photographs of leaf samples used for non-invasive anthocyanin quantification via the device and method of the present disclosure.
Figure 4A:
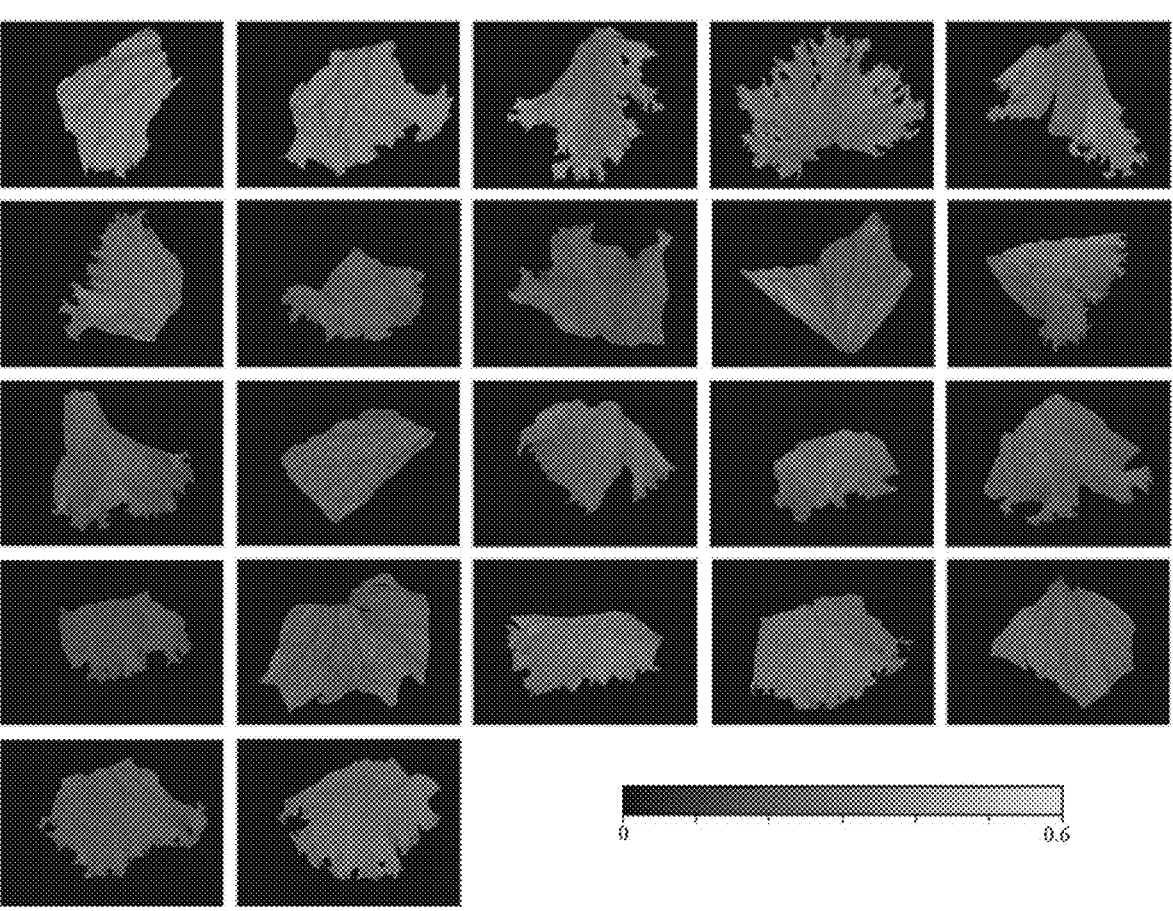
FIG. 4A shows fluorescence images induced from the corresponding leaf samples of FIG. 3 by exciting the leaves using green light of 535 nm (green excitation). The results from these can be used to determine the anthocyanin index. The anthocyanin index (an indication of the amount of anthocyanin) can be derived by taking a logarithm of the quotient (i.e. numerical value) obtained from dividing the level (or intensity) of fluorescence using red light of 630 nm ($F_r$) by the level (or intensity) of fluorescence using green light of 535 nm ($F_g$), wherein the anthocyanin index is denoted as log ($F_r$/$F_g$) (or log $F_r$/$F_g$ for brevity).
Figure 4B:
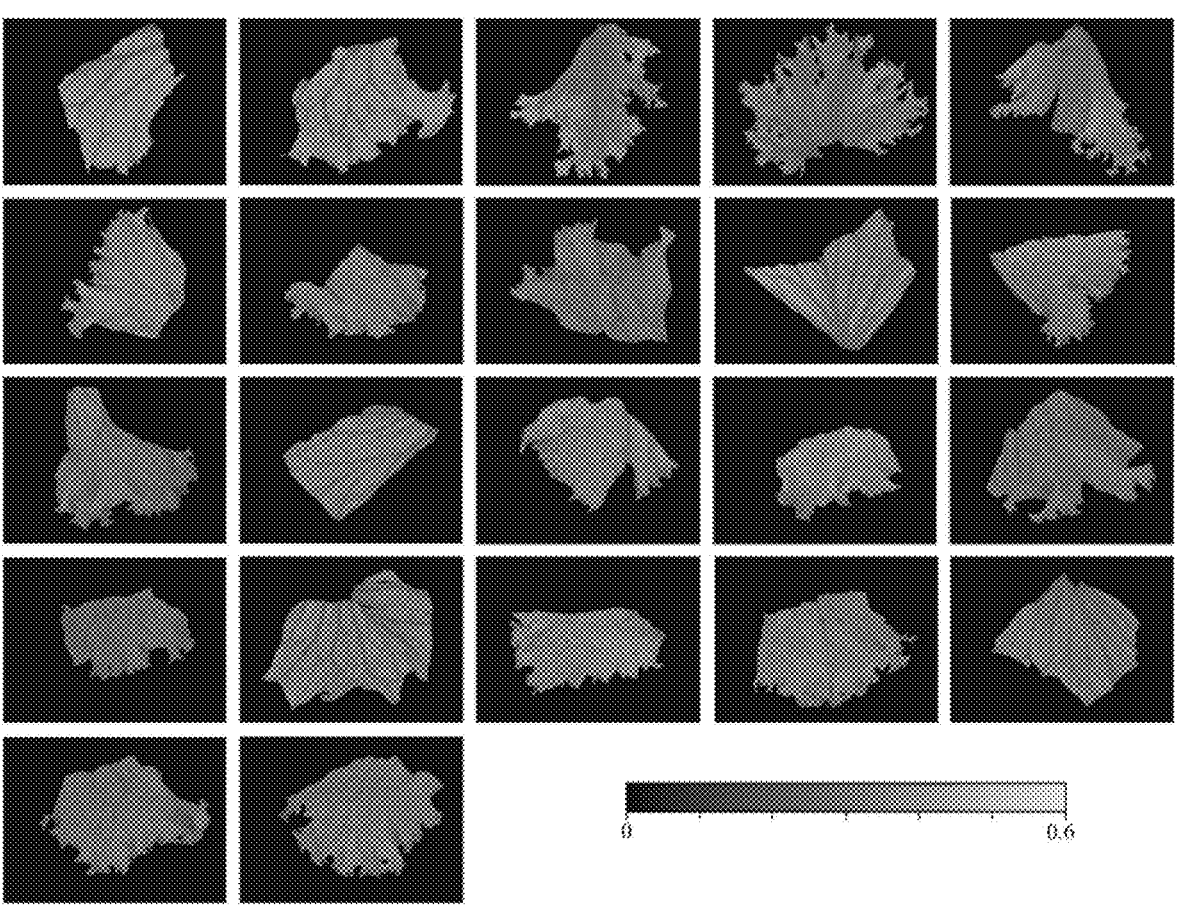
FIG. 4B shows fluorescence images induced from the corresponding leaf samples of FIG. 3 by exciting the leaves using red light of 630 nm (red excitation). The results from these can be used to determine the anthocyanin index. The color map corresponds to the $F_g$ in the same range for direct visualization and comparison.
Figure 4C:
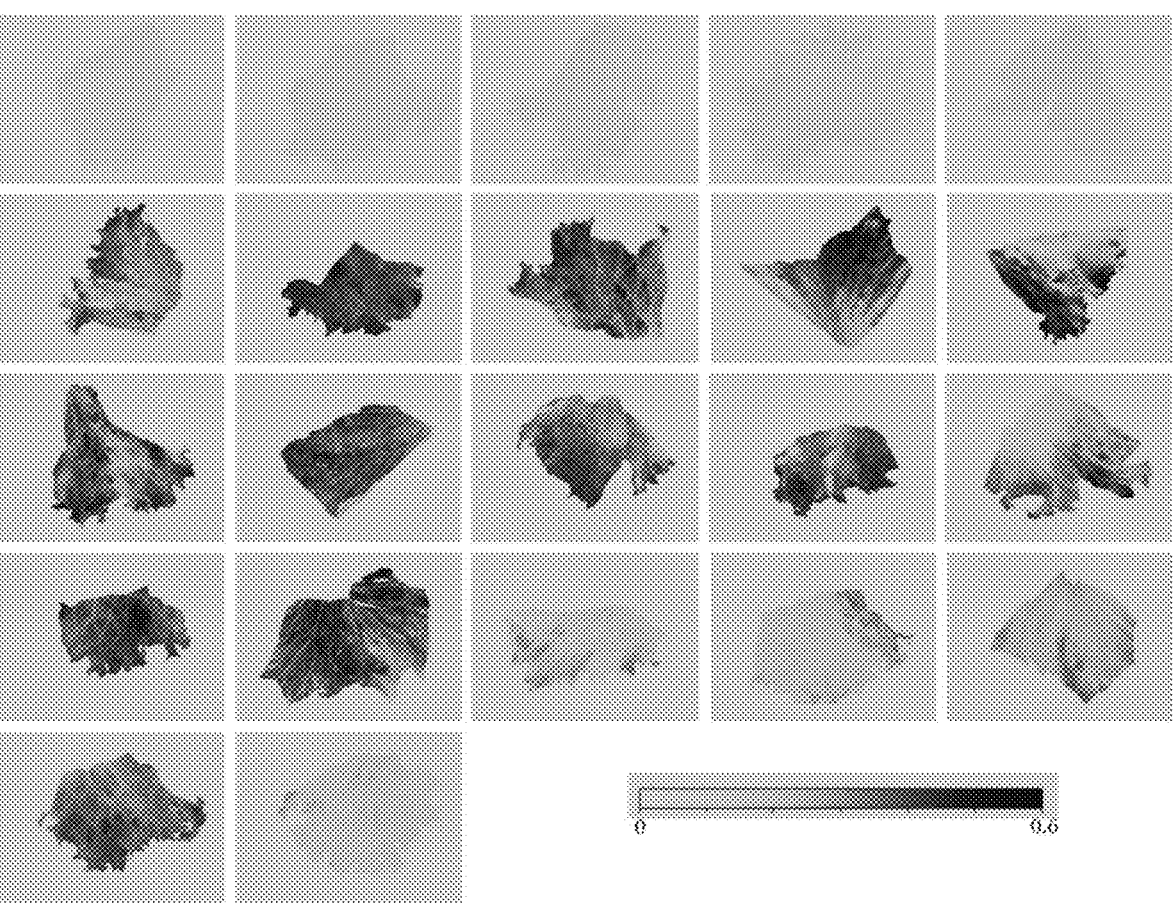
FIG. 4C shows the calculated anthocyanin index for the corresponding leaf samples of FIGS. 3, 4A and 4B. As mentioned above, the anthocyanin index (denoted as log ($F_r$/$F_g$)), can be derived by taking a logarithm of the quotient (i.e. numerical value) obtained from dividing the level (or intensity) of fluorescence using red light of 630 nm ($F_r$) by the level (or intensity) of fluorescence using green light of 535 nm ($F_g$).

In another example, the experiment was carried out on control plants and plants that were subjected to drought conditions, with dark adaption adopted (see FIG. 2C). The working distance was adjusted to 20 cm with the field of view (FOV) of 23 cm by 17 cm. After 3 hours of dark adaption, the ML was applied to obtain the minimal fluorescence ($F_O$) pixel-wisely, followed by a SP to get maximal fluorescence $F_m$. Then, five MLs were irradiated on the samples to measure the fluorescence response after SP. It should be noted that the number of MLs for irradiated the samples is adjustable. The AL was turned on after that and together with sequential MLs and SPs, steady state fluorescence $F_t$ (after photosynthesis is stable) and maximal fluorescence after light adaption $F_m'$ were obtained. Then, maximum efficiency of photosystem II (denoted as $Y_{max}$, wherein $Y_{max}=(F_m-F_0)/F_m$) and YII can be calculated. The preliminary results are shown in FIG. 2C.

Example 3: Anthocyanin Measurement

Anthocyanin belongs to polyphenols and water-soluble pigments existing in many food plants like blueberries, raspberry, black rice, and purple leafy vegetables. It is understood have antioxidant properties. Measurement for anthocyanin in a plant part can be realized through the present device based on chlorophyll screening effect. Polyphenols in plant exist in epidermis while chlorophyll is in mesophyll. Light has to penetrate the layer containing polyphenol before reaching and getting absorbed by chlorophyll. Anthocyanin strongly absorbs green light but allows red light to transmit through (i.e. red light passes through). Chlorophyll can generate far-red fluorescence induced by short-green and red light. The logarithm of the ratio $F_{red}/F_{green}$ (abbreviated as log ($F_r/F_g$)) can be used to indicate anthocyanin content. The ratio is understandably a quotient, i.e. a numerical value. A 100 ms red pulse not absorbed by anthocyanin illuminates the plant first followed by 100 ms green pulse absorbed by anthocyanin. The received near-infrared fluorescence generated by chlorophyll is used to calculate anthocyanin index.

The experiment was carried out on purple and green lettuce and the results are shown in FIGS. 3 and 4A to 4D. It clearly shows that green lettuce has higher green and red induced near-infrared fluorescence while purple lettuce shows relatively lower fluorescence yield. However, by taking ratio of $F_{red}$ and $F_{green}$, purple lettuce shows much higher value than green lettuce as expected, due to richer anthocyanin content in the purple lettuce.

To put it differently, the anthocyanin index (and content) can be derived using the present method and device, by operating a control module to (i) have the light-emitting diodes emit the light as pulse signals and (ii) modulate amplitude and width of the pulse signals, which includes operating the control module to have the light-emitting diodes irradiate red light (e.g. in the range of 630 nm to 650 nm, e.g. 630 nm) on the plant part to induce a first far-red fluorescence intensity signal (denoted as $F_r$) from the plant part, and then irradiate green light (e.g. in the range of 495 nm to 570 nm, e.g. 535 nm) on the plant part to induce a second far-red fluorescence intensity signal (denoted as $F_g$) from the plant part. Then, the first far-red fluorescence intensity signal is divided by the second far-red fluorescence intensity signal to obtain a numerical value, and taking a logarithm of the numerical value to identify anthocyanin content in the plant part (i.e. log $F_r/F_g$). The numerical value is understandably a "quotient" and a "ratio" in the present disclosure.

Example 4: Flavonols Measurement

Flavonols, which are a class of flavonoids and polyphenols, are present in a wide variety of fruits and vegetables.

Measurement of flavonols is based on the same principle and similar method as the measurement for anthocyanin, except replacing green LED with UV LED. The 100 ms red pulse light is not be absorbed by flavonols while the 100 ms UV pulse light is be absorbed by flavonols. Similar to the calculation for anthocyanin index described above, a logarithm denoted as log ($F_{red}/F_{uv}$), or log $F_r/F_{uv}$ for brevity, is calculated for the flavonol index.

To put it differently, the flavonol index (and content) can be derived using the present method and device, by operating a control module to (i) have the light-emitting diodes emit the light as pulse signals and (ii) modulate amplitude and width of the pulse signals, which includes operating the control module to have the light-emitting diodes irradiate red light (e.g. in the range of 630 nm to 650 nm, e.g. 630 nm) on the plant part to induce a first far-red fluorescence intensity signal (denoted as $F_r$) from the plant part, and then irradiate ultraviolet light (e.g. in the range of 320 nm to 380 nm) on the plant part to induce a second far-red fluorescence intensity signal (denoted as $F_{uv}$) from the plant part. Then, the first far-red fluorescence intensity signal is divided by the second far-red fluorescence intensity signal to obtain a numerical value, and taking a logarithm of the numerical value to identify a flavonol content in the plant part (i.e. log $F_r/F_{uv}$). The numerical value is understandably a "quotient" and a "ratio" in the present disclosure.

Example 5: Summary Commercial and Potential Applications

In the present disclosure, a compact, handheld fluorescence imaging device equipped with multi-color LEDs (RGB-UV) was developed to achieve wide-field real-time and non-contact plant monitoring. The present device provides for morphologic and functional information including maximal fluorescence ($F_m$), steady-state terminal fluorescence ($F_t$), efficiency of photosystem II (YII), flavonol content index and anthocyanin content index. Since images are obtained, the distribution of all these parameters on the plant can be captured pixel-wisely simultaneously, unlike traditional point measurement which is time-consuming and renders no morphological information. Moreover, the present device is portable and the probe is handheld. Hence, it is suitable for both indoor and outdoor farming applications.

While the present disclosure has been particularly shown and described with reference to specific embodiments, it should be understood by those skilled in the art that various changes in form and detail may be made therein without departing from the spirit and scope of the present disclosure as defined by the appended claims. The scope of the present disclosure is thus indicated by the appended claims and all changes which come within the meaning and range of equivalency of the claims are therefore intended to be embraced.

The invention claimed is:

1. A portable device operable to identify photosynthetic activity and contents of compounds in a plant part, the portable device comprises:
    a light source comprising light-emitting diodes operable to irradiate the plant part with light comprising more than one wavelength;
    a control module operable to (i) have the light-emitting diodes emit the light as pulse signals and (ii) modulate amplitude and width of the pulse signals, which involve:
        the control module operable to have the light-emitting diodes irradiate red light on the plant part to induce a first far-red fluorescence intensity signal from the plant part, and then irradiate ultraviolet light on the plant part to induce a second far-red fluorescence intensity signal from the plant part;

a focus-adjustable lens and a filter optically coupled to the light source, wherein the adjustable lens and the filter are co-operable to consolidate light reflected from the plant part which is irradiated by light from the light-emitting diodes; and a detector optically positioned to receive from the focus-adjustable lens and the filter the light reflected from the plant part, wherein the light reflected from the plant part corresponds to the photosynthetic activity and contents of compounds in the plant part, and the light reflected is transmitted as fluorescence, wherein, from the control module, a numerical value is rendered by dividing the first far-red fluorescence intensity signal by the second far-red fluorescence intensity signal; and having a flavonol content in the plant part identified by taking a logarithm of the numerical value.

2. The portable device of claim 1, wherein the light source comprises the light-emitting diodes arranged circumferentially to the detector.

3. The portable device of claim 1, wherein the light source comprises the light-emitting diodes arranged circumferentially on a panel, and wherein the panel comprises an opening which the detector is optically positioned at to receive the light reflected from the plant part.

4. The portable device of claim 1, wherein the light comprising more than one wavelength has a wavelength ranging from 100 nm to 760 nm.

5. The portable device of claim 1, wherein the control module is operable to have each of the light-emitting diodes independently emit light at different brightness.

6. The portable device of claim 1, wherein the control module is operable to have the light-emitting diodes emit blue light, wherein the blue light comprises a first pulse signal and a second pulse signal, and wherein the first pulse signal has a shorter pulse width and a lower amplitude than the second pulse signal.

7. The portable device of claim 1, wherein the control module is operable to have the light-emitting diodes emit red light and then green light, and wherein the red light and the green light are configured to produce identical photoactive radiation.

8. The portable device of claim 1, wherein the red light and the ultraviolet light are configured to produce identical photoactive radiation.

9. The portable device of claim 1, wherein the filter comprises a long-pass filter which consolidates fluorescence reflected from the plant part.

10. The portable device of claim 1, wherein the detector is a charge-coupled device detector.

11. A method of identifying photosynthetic activity and contents of compounds in a plant part using the portable device of claim 1, the method comprising:

irradiating the plant part with light comprising more than one wavelength from a light source comprising light-emitting diodes;

operating a control module to (i) have the light-emitting diodes emit the light as pulse signals and (ii) modulate amplitude and width of the pulse signals;

operating a focus-adjustable lens and a filter to consolidate light reflected from the plant part which is irradiated by light from the light-emitting diodes, wherein the focus-adjustable lens and the filter are optically coupled to the light source; and operating a detector which is optically positioned to receive from the focus-adjustable lens and the filter the light reflected from the plant part, wherein the light reflected from the plant part corresponds to the photosynthetic activity and contents of compounds in the plant part, and the light reflected is transmitted as fluorescence, wherein operating a control module to (i) have the light-emitting diodes emit the light as pulse signals and (ii) modulate amplitude and width of the pulse signals comprises:

operating the control module to have the light-emitting diodes irradiate red light on the plant part to induce a first far-red fluorescence intensity signal from the plant part, and then irradiate ultraviolet light on the plant part to induce a second far-red fluorescence intensity signal from the plant part, and further comprising:

dividing the first far-red fluorescence intensity signal by the second far-red fluorescence intensity signal to obtain a numerical value; and taking a logarithm of the numerical value to identify a flavonol content in the plant part.

12. The method of claim 11, wherein irradiating the plant part with the light comprising more than one wavelength comprises:

operating the light-emitting diodes at a voltage ranging from 0.1 mV to 10 V; and/or operating each of the light-emitting diodes independently at 0.1 mA to 10 A to emit light at different brightness.

13. The method of claim 11, wherein operating a control module to (i) have the light-emitting diodes emit the light as pulse signals and (ii) modulate amplitude and width of the pulse signals comprises:

operating the control module to have the light-emitting diodes irradiate blue light having a first pulse signal on the plant part to induce a minimum or steady state fluorescence intensity signal from the plant part;

operating the control module to have the light-emitting diodes irradiate blue light having a second pulse signal on the plant part to induce a maximum fluorescence intensity signal from the plant part in a lit environment; and wherein the first pulse signal has a shorter pulse width and a lower amplitude than the second pulse signal.

14. The method of claim 13, wherein operating the control module to have the light-emitting diodes irradiate blue light having the first pulse signal on the plant part is carried out in a dark environment or a lit environment.

15. The method of claim 13, further comprising:

subtracting the maximum fluorescence intensity signal with the minimum or steady state fluorescence intensity signal to obtain a numerator; and dividing the numerator with the maximum fluorescence intensity signal to identify the photosynthetic activity.

16. The method of claim 11, wherein operating a control module to (i) have the light-emitting diodes emit the light as pulse signals and (ii) modulate amplitude and width of the pulse signals comprises:

operating the control module to have the light-emitting diodes irradiate red light on the plant part to induce a first far-red fluorescence intensity signal from the plant part, and then irradiate green light on the plant part to induce a second far-red fluorescence intensity signal from the plant part.

17. The method of claim 16, further comprising:

dividing the first far-red fluorescence intensity signal by the second far-red fluorescence intensity signal to obtain a numerical value; and taking a logarithm of the numerical value to identify anthocyanin content in the plant part.

\* \* \* \* \*